United States Patent
Cyr et al.

(10) Patent No.: US 8,055,772 B2
(45) Date of Patent: Nov. 8, 2011

(54) SYSTEM FOR EFFECTING COMMUNICATION AMONG A PLURALITY OF DEVICES AND METHOD FOR ASSIGNING ADDRESSES THEREFOR

(75) Inventors: Bernard Louis Cyr, Aurora, IL (US); Carl Lindsey Schumann, Aurora, IL (US); Andrew F. Scott, North Aurora, IL (US)

(73) Assignee: Alcatel Lucent, Paris (FR)

( * ) Notice: Subject to any disclaimer, the term of this patent is extended or adjusted under 35 U.S.C. 154(b) by 1578 days.

(21) Appl. No.: 10/097,754

(22) Filed: Mar. 14, 2002

(65) Prior Publication Data

US 2003/0177211 A1 Sep. 18, 2003

(51) Int. Cl.
*G06F 15/16* (2006.01)

(52) U.S. Cl. .......................... 709/226; 709/246

(58) Field of Classification Search .................. 709/203, 709/220, 221, 222, 223, 226, 246; 714/1, 714/4, 6, 15; 370/401, 338
See application file for complete search history.

(56) References Cited

U.S. PATENT DOCUMENTS

| | | | | |
|---|---|---|---|---|
| 6,424,654 B1 * | 7/2002 | Daizo | ........................... | 370/401 |
| 6,583,902 B1 * | 6/2003 | Yuen | ............................. | 398/135 |
| 6,618,757 B1 * | 9/2003 | Babbitt et al. | ................ | 709/226 |
| 6,684,243 B1 * | 1/2004 | Euget et al. | ................... | 709/222 |
| 6,792,474 B1 * | 9/2004 | Hopprich et al. | ............. | 709/245 |
| 6,802,117 B2 * | 10/2004 | Dalisay | ........................... | 29/758 |
| 6,854,072 B1 * | 2/2005 | Cagle et al. | .................... | 714/15 |
| 6,862,286 B1 * | 3/2005 | Tams et al. | .................... | 370/401 |

* cited by examiner

*Primary Examiner* — David Lazaro

(74) *Attorney, Agent, or Firm* — Carmen Patti Law Group, LLC

(57) ABSTRACT

A method for effecting assignment of addresses in a system including at least one server device communicatingly coupled with a plurality of client devices, the addresses permitting communications among the at least one server device and at least one selected client device, includes the steps of: (a) identifying a respective geographic locus for each respective client device; and (b) assigning a respective geographic address for each respective client device; each respective geographic address identifying a particular respective geographic locus for a particular respective client device. A system for effecting communication among a plurality of server devices and a plurality of client devices includes: (a) a communication bus coupling the plurality of server devices; and (b) a plurality of connection loci coupled with the communication bus. Respective client devices are coupled with selected connection loci. Each respective connection locus is uniquely identified by a respective address.

10 Claims, 4 Drawing Sheets

SYSTEM FOR EFFECTING COMMUNICATION AMONG A PLURALITY OF DEVICES AND METHOD FOR ASSIGNING ADDRESSES THEREFOR

BACKGROUND OF THE INVENTION

The present invention is directed to construction of components within a system to facilitate easier, more cost effective operation and maintenance of the system. In particular, in its preferred embodiment the invention relates to an addressing arrangement in a system that employs Dynamic Host Configuration Protocol (DHCP) servers for communicating with a plurality of client devices via a communication bus structure. The invention is embodied in a method for implementation of the addressing arrangement and in the system that employs the addressing arrangement.

In systems that include server apparatuses that are required to communicate with client devices for effecting the configuration of the client devices, there is a need for both the servers and the clients to be able to uniquely identify each client device in order to configure each client correctly. This identifier is provided to one or more servers when requesting configuration information for itself, so that the server or servers know which client's configuration is to be supplied. The need for unique identifiers being assigned to client devices is complicated as more servers are added to the system to provide parallelism and backup capabilities for the system. The need for unique identification of client devices is even further exacerbated when address assignment is effected dynamically by servers during operations. The unique client identifiers are typically an address of some sort, as will be described below herein.

One exemplary such dynamic addressing system is a Dynamic Host Configuration Protocol (DHCP) system. DHCP is an operational protocol standard that permits a server to dynamically assign Internet Protocol (IP) addresses to nodes or workstations (i.e., client devices) on the fly. The DHCP protocol supports manual, automatic and dynamic address assignment. It is in the dynamic address assignment arrangement that the present invention is especially advantageous. A prior art DHCP protocol system operating in a dynamic address assignment mode provides client information, including subnetwork mask, gateway address and Internet addresses (i.e., IP addresses). The DHCP server is generally configured as a dedicated server. In dynamic address assignment, the DHCP server verifies a given client device's identity, "leases" an IP address to the client device (usually for a given period of time) and reclaims the address for reassignment at the expiration of the lease period. Thus, the DHCP protocol permits assignment of IP addressees from a common address pool and facilitates re-use of addresses. Such reusing of addresses for limited lease periods is advantageous in relieving strain on address numbering schemes that offer limited digits for coding addresses.

There are two important design results that are desirable in implementing a DHCP addressing scheme in a server-client system. (1) It is desirable to provide redundant service without requiring communication among the servers themselves. Such a desirable arrangement requires that the DHCP address database have a fixed association between client identifiers (e.g., hardware identification) and IP addresses. (2) It is desirable to allow a failed client device to be replaced merely by removing the failed client device and installing a replacement device in its place, commonly known as a "plug-and-play" replacement, and that the new client retains the Internet address, i.e., IP address, that was originally assigned to the now-failed client. The retention of the original IP address allows other components on the network that communicate with the clients to be able to communicate with the new client without reconfiguration of those other components. That is, in replacing a client device there is no need for reconfiguration of the DHCP server or reconfiguration of the client device when effecting the replacement.

Prior art DHCP protocol systems have been configured to satisfy either design result (1) or design result (2). However, no prior art DHCP protocol system has succeeded in satisfying both of design results (1) and (2).

Prior art DHCP protocol systems have satisfied design result (1) by configuring each DHCP server with identical associations between client identifiers (e.g., a hardware address or a DHCP client identification string) and IP addresses. Because a hardware address is associated with the particular item of hardware employed for the client device, replacement of the client device necessarily requires reconfiguration of the DHCP servers with the new hardware address. That is, a technician must enter the new hardware identification into the servers indicating the new piece of hardware that constitutes the replacement client device.

In such manner, design result (1) is satisfied, but design result (2) cannot be satisfied. By way of farther example, if a DHCP client identification string is employed, the DHCP servers must somehow be notified of the new identification string associated with the replacement client device at or before the time the client device first communicates with the servers. However, in order for the replacement client device to properly present the required information to the server the DHCP client identification string must be known to the replacement client device itself. The DHCP client identification string would need to be entered into a non-volatile storage site in the replacement client device. A DHCP client identification string depends upon exactly where in the system the replacement client device is installed. For this reason the DHCP client identification string cannot be entered into the client device non-volatile storage before its installation. A technician must intervene during installation of the replacement client device to configure the replacement client device with its location-related information. That is, a technician installing a replacement client device must enter the DHCP client identification string into the non-volatile memory of the client device, including information regarding the location within the system at which the new client device is situated. This requirement for on-site entry of information into a client device during installation precludes satisfying design result (2).

Prior art DHCP protocol systems have satisfied design result (2) by employing a single DHCP server that maintains dynamic associations between hardware addresses and IP addresses. Because there is only a single DHCP server in such systems there is no need for communication between or among several DHCP servers to maintain hardware address-IP address associations. However, for the very reason that there is only one DHCP server in such prior art arrangements, no redundancy of DHCP server functions can be provided and design result (1) cannot be satisfied.

There is a need for a system for effecting communication among a plurality of devices and servers, and a method for assigning addresses therefor that can provide redundant service without requiring communication among servers and that can permit device replacement without reconfiguration of servers or the replacement device.

SUMMARY OF THE INVENTION

A method for effecting assignment of addresses in a system including at least one server device communicatingly coupled with a plurality of client devices, the addresses permitting communications among the at least one server device and at least one selected client device, includes the steps of: (a) identifying a respective geographic locus for each respective client device; and (b) assigning a respective geographic address for each respective client device; each respective geographic address identifying a particular respective geographic locus for a particular respective client device.

A system for effecting communication among a plurality of server devices and a plurality of client devices includes: (a) a communication bus coupling the plurality of server devices; and (b) a plurality of connection loci coupled with the communication bus. Respective client devices are coupled with selected connection loci. Each respective connection locus is uniquely identified by a respective address.

It is, therefore, an object of the present invention to provide a system for effecting communication among a plurality of devices and servers, and a method for assigning addresses therefor that can provide redundant service without requiring communication among servers and that can permit device replacement without reconfiguration of servers or the replaced device.

Further objects and features of the present invention will be apparent from the flowing specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
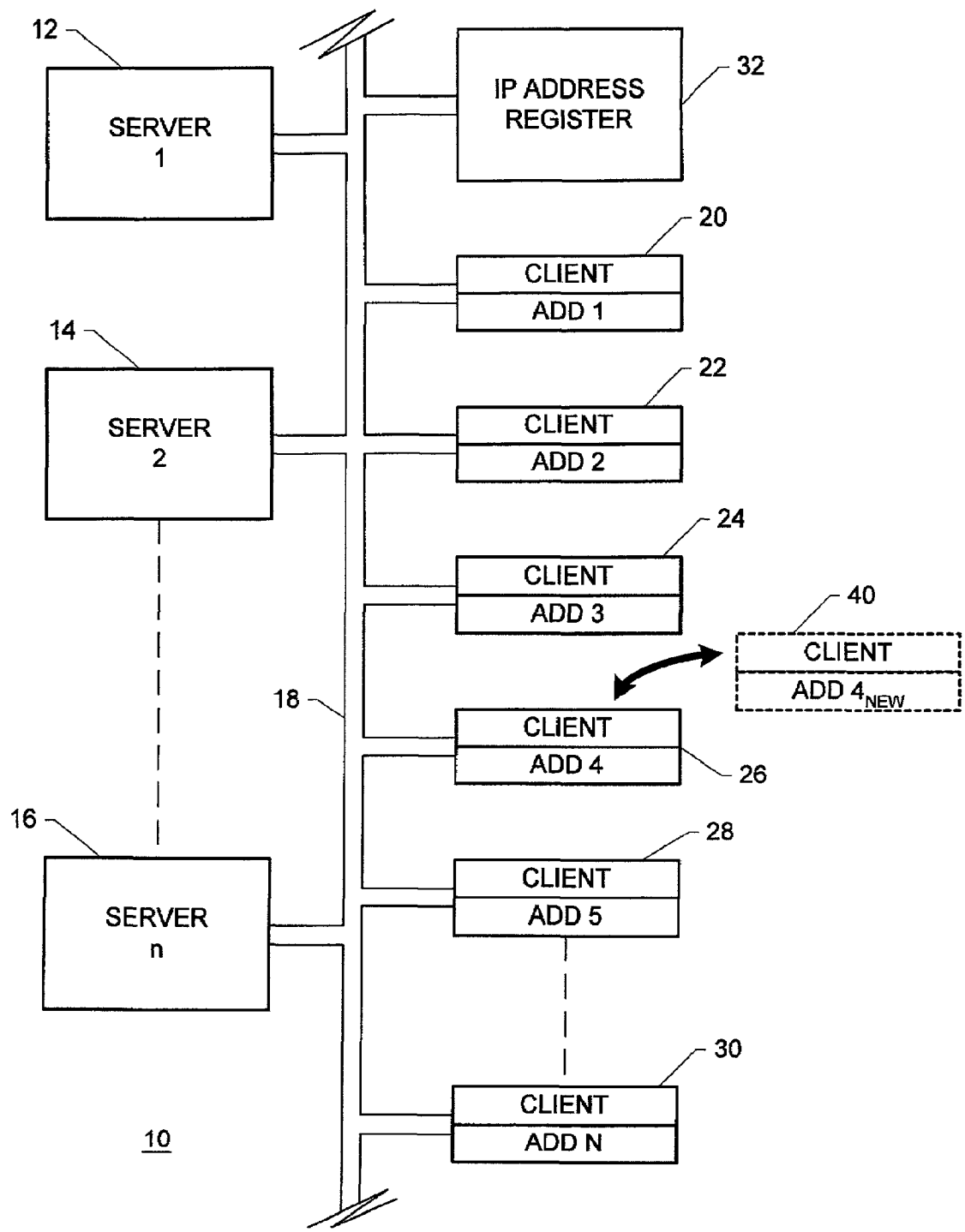
FIG. 1 is a schematic diagram illustrating a prior art system for effecting communication among a plurality of devices and method for assigning addresses therefor.

FIG. 1 is a schematic diagram illustrating a prior art system for effecting communication among a plurality of devices and method for assigning addresses therefor. In FIG. 1, a system 10 includes servers 12, 14, 16. The use of the term "n" in association with labeling server 16 indicates there is not a limit to the number of servers that may be included in system 10. Servers 12, 14, 16 are communicatingly coupled with a communication bus 18. Communication bus 18 is communicatingly coupled with client devices 20, 22, 24, 26, 28, 30. Each respective client device 20, 22, 24, 26, 28, 30 is uniquely identified by a respective address. Thus, client device 20 is uniquely identified by address ADD 1. Client device 22 is uniquely identified by address ADD 2. Client device 24 is uniquely identified by address ADD 3. Client device 26 is uniquely identified by address ADD 4. Client device 28 is uniquely identified by address ADD 5. Client device 30 is uniquely identified by address ADD N. The use of the term "N" in association with the address associated with client device 30 indicates there is not a limit to the number of client devices that may be included in system 10.

Internet Protocol (IP) addresses for assignment to respective client devices 20, 22, 24, 26, 28, 30 are available from an address register 32. When system 10 is embodied in a Dynamic Host Configuration Protocol (DHCP) system, IP addresses may be "leased" to client devices 20, 22, 24, 26, 28, 30 from address register 32 for a lease period and then returned to address register 32.

When a client device 20, 22, 24, 26, 28, 30 must be replaced, as in the case of replacing client device 26 with a replacement client device 40 as illustrated in FIG. 1, the address ADD $4_{NEW}$ for replacement device 40 must be somehow entered into system 10. Sometimes the address information for a client device is keyed to the hardware unit itself, as in the case of a MAC (Media Access Control) address. A MAC address is identified at the Media Access Control layer of network architecture. Such addresses are often indicated on a label affixed to the device. In such a situation, when a replacement client device, such as replacement client device 40 (FIG. 1) is inserted into system 10, the technician effecting the replacement must read the MAC address from a label on replacement client device 40 and enter the new MAC address ADD $4_{NEW}$ into system 10 appropriately to alert or update or reconfigure servers 12, 14, 16 of the new address ADD $4_{NEW}$ associated with replacement client device 40. Alternatively, new address ADD $4_{NEW}$ may be a DHCP client identification string. In such a case, new address ADD $4_{NEW}$ must contain an indication of the precise location of replacement client device 40 within system 10. The precise location information must be entered in the non-volatile memory of replacement client device 40 so that servers 12, 14, 16 can ascertain identity as well as location of replacement client device 40 when required. The required precise location information cannot be known until it is known which client device 20, 22, 24, 26, 28, 30 is to be replaced by replacement client device 40.

Thus, in prior art system 10 (FIG. 1) when a client device 20, 22, 24, 26, 28, 30 is replaced by a replacement client device 40 having a new address ADD $4_{NEW}$, there must be some action taken by a technician to reconfigure system 10 (either reconfiguring servers 12, 14, 16 or reconfiguring replacement client device 40) with an indication of new address ADD $4_{NEW}$.

Figure 2:
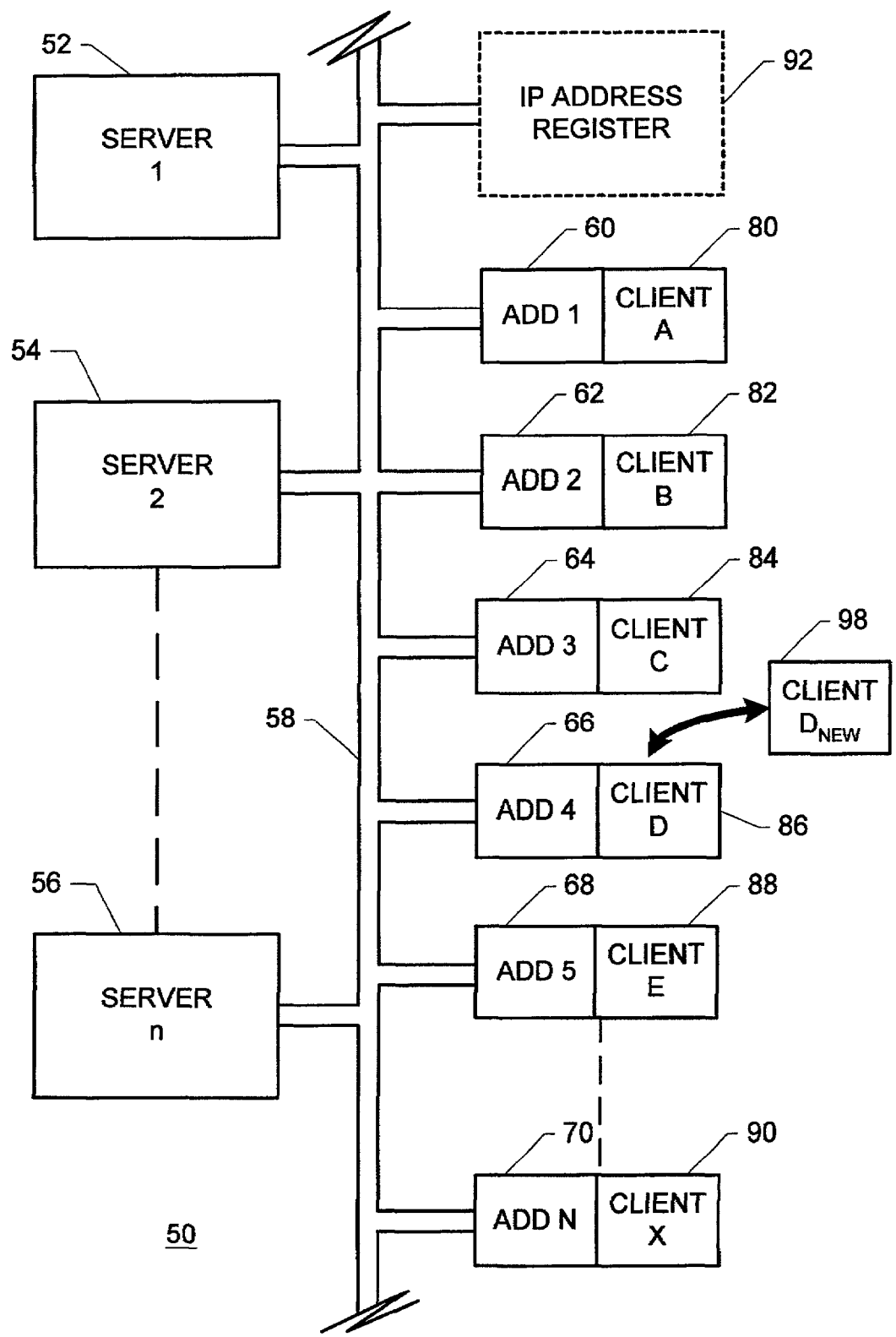
FIG. 2 is a schematic diagram illustrating selected details of construction of a representative system for effecting communication among a plurality of devices.

FIG. 2 is a schematic diagram illustrating selected details of construction of a representative system for effecting communication among a plurality of devices. In FIG. 2, a system 50 includes servers 52, 54, 56. The use of the term "n" in association with labeling server 56 indicates there is not a limit to the number of servers that may be included in system 50. Servers 52, 54, 56 are communicatingly coupled with a communication bus 58. Communication bus 58 is communicatingly coupled with geographic loci 60, 62, 64, 66, 68, 70. A representative geographic locus as an embodiment for geographic loci 60, 62, 64, 66, 68, 70 is a slot structure on a motherboard in a computing system. Each respective geographic locus 60, 62, 64, 66, 68, 70 is uniquely identified by a respective address. Thus, geographic locus 60 is uniquely identified by address ADD 1. Geographic locus 62 is uniquely identified by address ADD 2. Geographic locus 64 is uniquely identified by address ADD 3. Geographic locus 66 is uniquely identified by address ADD 4. Geographic locus 68 is uniquely identified by address ADD 5. Geographic locus 70 is uniquely identified by address ADD N. The use of the term "N" in association with the address associated with geographic locus 70 indicates there is not a limit to the number of geographic loci that may be included in system 50.

Each respective geographic locus 60, 62, 64, 66, 68, 70 is communicatingly coupled with a respective client device 80, 82, 84, 86, 88, 90. Thus, geographic locus 60 is communicatingly coupled with client device 80, labeled CLIENT A in FIG. 2. Geographic locus 62 is communicatingly coupled with client device 82, labeled CLIENT B in FIG. 2. Geographic locus 64 is communicatingly coupled with client device 84, labeled CLIENT C in FIG. 2. Geographic locus 66 is communicatingly coupled with client device 86, labeled CLIENT D in FIG. 2. Geographic locus 68 is communicatingly coupled with client device 88, labeled CLIENT E in FIG. 2. Geographic locus 70 is communicatingly coupled with client device 90, labeled CLIENT X in FIG. 2. The use of the term "X" in association with client device 90 indicates there is not a limit to the number of client devices that may be included in system 50.

Internet Protocol (IP) addresses for assignment to respective geographic loci 60, 62, 64, 66, 68, 70 are available from an address register 92. When system 50 is embodied in a Dynamic Host Configuration Protocol (DHCP) system, IP addresses may be "leased" to geographic loci 60, 62, 64, 66, 68, 70 from address register 92 for a lease period and then returned to address register 92.

When a client device 80, 82, 84, 86, 88, 80 must be replaced, as in the case of replacing client device 86 with a replacement client device 98 as illustrated in FIG. 2, the address for routing communications to replacement client device 98 remains unchanged; it remains the address ADD 4 for geographic locus 66. This is the main point of departure from the prior art systems and addressing schemes that is manifested in the present invention. Preferably, client devices 80, 82, 84, 86, 90 and replacement client device 98 are configured for removable coupling within system 50 at geographic loci 60, 62, 64, 66, 68, 70. Such removable coupling may be by a plug and socket structure or by another structure providing a similar "plug and play" coupling arrangement. Thus, when a technician replaces client device 86 with replacement client device 98, no further action is required in the way of reconfiguring any aspect of system 50. Servers 52, 54, 56 continue to use addresses for geographic loci 60, 62, 64, 66, 68, 70 for leasing or otherwise assigning addressees from address register 92. Address register 92 is illustrated in FIG. 2 in dotted line format to indicate that address register 92 is not a physical component of the system. Address register 92 is a conceptual register representing that the correspondence between client identifiers and client configuration data is fixed; such correspondence does not change. Administrative procedures or automated systems at a system construction/installation such as system 50 insure that the contents of conceptual address register 92 are replicated identically on all servers 52, 54, 56. Geographic loci 60,62, 64, 66, 68, 70 do not change when any of client devices 80, 82, 84, 86, 88, 90 is replaced, and therefore the address for a respective geographic locus 60, 62, 64, 66, 68, 70 need not change.

System 50 (FIG. 2) can satisfy both of the design results set forth above for a DHCP protocol system: (1) System 50 can provide redundant service without requiring communication among the servers themselves. Such a desirable arrangement requires that the DHCP address database have a fixed association between client identifiers (e.g., hardware identification) and IP addresses. (2) System 50 can allow a failed client device to be replaced merely by removing the failed client device and installing a replacement device in its place, commonly known as a plug-and-play replacement. That is, in replacing a client device, there is no need for reconfiguration of the DHCP server or reconfiguration of the client device in effecting the replacement. In addition, as required by this design result (2), the new client device will retain the IP address that was originally assigned to the previous, now-replaced client device because the geographical address of the client device is unchanged.

Design result (1) is satisfied by system 50 because multiple servers 52, 54, 56 provide the desired redundancy, and the unchanging nature of addresses for geographic loci 60, 62, 64, 66, 68, 70 provides the desired fixed association between client identifiers and IP addresses. Design result (2) is satisfied by system 50 because there is no need to reconfigure any server 52, 54, 56, or to reconfigure replacement client device 98 or to reconfigure any other component of system 50 when replacing a client device.

An important feature of the present invention is its use of the capability of a processor, such as a server, to know or learn the location within a system of a particular connection locus. Said another way, a processor can learn and store the geographical address of a particular connection locus within the system in which it operates. Using such standards as Peripheral Component Interconnect (PCI) or compact PCI (cPCI), for example, a processor can know or learn the geographical address of each drawer or chassis in a system, and further can know or learn the geographical address of each board and slot within a given drawer or chassis.

Figure 3:
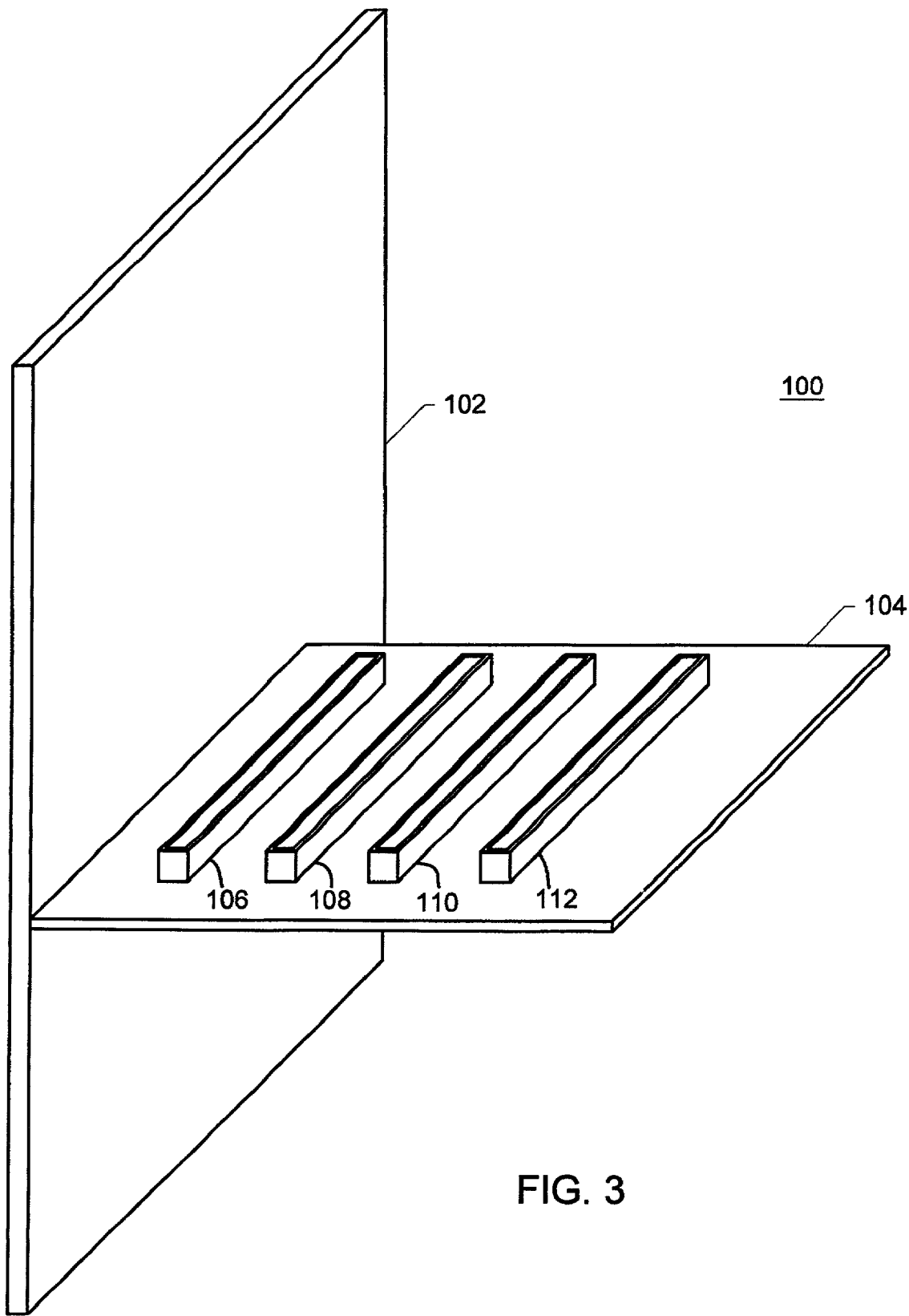
FIG. 3 is a schematic diagram illustrating a portion of a system for effecting communication among a plurality of devices and a representative method for assigning addresses therefor according to the teachings of the present invention.

FIG. 3 is a schematic diagram illustrating a portion of a system for effecting communication among a plurality of devices and a representative method for assigning addresses therefor according to the teachings of the present invention. In FIG. 3, a system 100 includes a plurality of chassis; one representative chassis 102 is illustrated in FIG. 3. Chassis 102 may electrically contain a plurality of boards; a representative board 104 is illustrated in FIG. 3. Board 104 may be connected approximately orthogonal to chassis 102. Board 104 electrically includes a plurality of slots 106, 108, 110, 112. The plurality of slots 106, 108, 110, 112 may be positioned on one side of board 104. Each respective slot 106, 108, 110, 112 is a geographic locus at which a client device may be communicatingly connected or coupled using pin arrays or other connecting components (not shown in detail in FIG. 3). Each of slots 106, 108, 110, 112 may be arranged in an approximate side by side configuration. Electrical connections for establishing communicating coupling among chassis 102, board 104 and slots 106, 108, 110, 112 are not shown in detail in FIG. 3 in order to avoid cluttering FIG. 3. System 100 may be embodied in a system such as system 50 (FIG. 2) so that each geographic locus 60, 62, 64, 66, 68, 70 corresponds with a slot such as one of slot 106, 108, 110, 112, and servers 52, 54, 56 can know or learn a unique geographic address (i.e., a unique drawer/chassis-board-slot site) for each geographic locus 60, 62, 64, 66, 68, 70.

Figure 4:
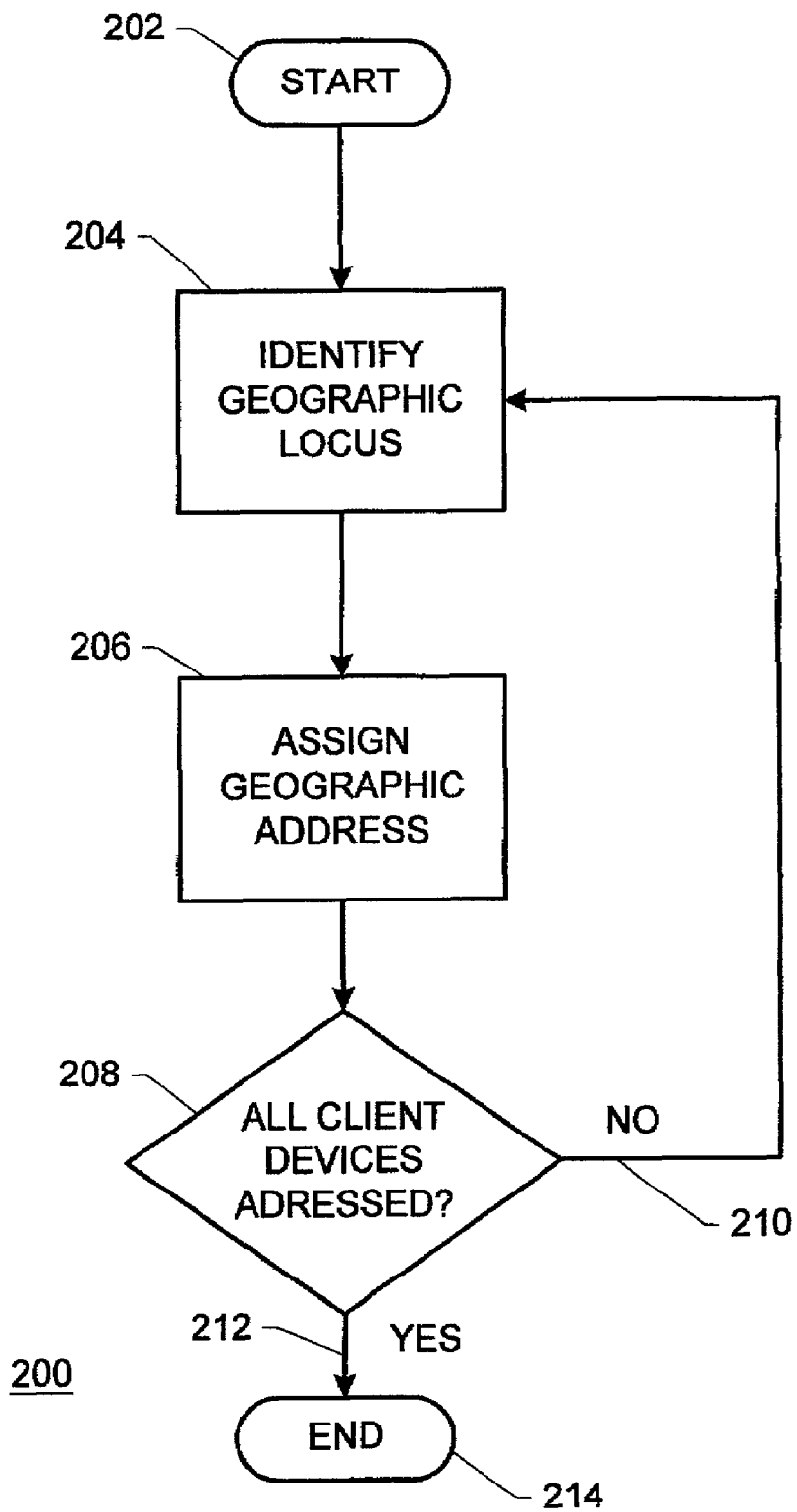
FIG. 4 is a flow diagram illustrating the method of the present invention.

FIG. 4 is a flow diagram illustrating the method of the present invention. In FIG. 4, a method 200 for effecting assignment of addresses in a system is illustrated. The system includes at least one server device and a plurality of client devices communicatingly coupled with the at least one server device. The addresses permit communications among the at least one server device and at least one selected client device of the plurality of client devices. Method 200 begins at a START locus 202 and proceeds to a step of identifying a respective geographic locus for a respective client device of the at least one selected client device, as indicated by a block 204.

Method 200 continues by assigning a respective geographic address for the respective client device, as indicated by a block 206. Each respective geographic address identifies a particular respective geographic locus for a particular respective client device.

Next, method 200 poses a query whether all client devices have been identified by an assigned geographic address, as indicated by a query block 208. If not all client devices have been identified by an assigned geographic address, method 200 proceeds via NO response line 210 to return to block 204 and another geographic locus associated with another client device is identified. Another respective geographic address is assigned to the newly identified geographic locus (block 206) and method 200 again inquires whether all client devices have been identified by an assigned geographic address. If all client devices have been identified by an assigned geographic address, method 200 proceeds via YES response line 212 to terminate, as indicated by an END locus 214.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

What is claimed is:

1. A method for effecting assignment of addresses in a system, said system including at least one server device and a plurality of client devices communicatingly coupled with said at least one server device, said addresses permitting communications among said at least one server device and at least one selected client device of said plurality of client devices, the method comprising the steps of:
    (a) identifying a respective non-mapped geographic locus for each respective client device of said at least one selected client device; and
    (b) assigning a respective non-mapped geographic address for each said respective client device, each said respective geographic address identifying a particular said respective geographic locus for a particular said respective client device; and
    wherein said respective client device and a replacement client device are configured for removable coupling, and wherein replacement of said respective client device with said replacement client device requires no reconfiguration of said system and permits the respective non-mapped geographic address to remain unchanged from the respective client device to the replacement client device, wherein said at least one server device is a plurality of Dynamic Host Configuration Protocol servers, wherein each said respective client device is coupled within said system at a respective system connection facility, each said respective geographic locus corresponding to the respective said system connection facility, each said respective geographic address identifying a particular said respective system connection facility, and wherein each said respective system connection facility comprises a particular slot at a particular backplane at a particular chassis in said system.

2. The method of claim 1 wherein at least one selected client device of said plurality of client devices is removably coupled with the respective non-mapped geographic locus.

3. The method of claim 1 wherein the at least one server device learns and stores the geographic address of said respective geographic locus based on a Peripheral Component Interconnect (PCI) standard or a compact PCI (cPCI) standard.

4. The method of claim 1 wherein both the replacement client device and the servers of the system retain the non-mapped geographic address of said respective client device.

5. A method for assigning addresses in a dynamic host configuration protocol (DHCP) operated system, said system including at least one DHCP server and a plurality of client devices coupled with said at least one DHCP server via a communication bus, the method comprising the steps of:
    (a) identifying a respective geographic locus within said system for each respective client device of said plurality of client devices, wherein the geographic locus identifies a non-mapped slot structure on a motherboard in a computing system; and
    (b) assigning a respective address for each said respective geographic locus, each said respective address identifying a particular said respective geographic locus for a particular said respective client device; and
    wherein each said respective client device and a replacement client device are configured for removable coupling, and wherein replacement of each said respective client device with one or more replacement client devices requires no reconfiguration of any of the servers of said system.

6. The method of claim 5 wherein at least one selected client device of said plurality of client devices is removably coupled with a respective said geographic locus.

7. A system for effecting communication among a plurality of server devices and a plurality of client devices, the system comprising:
    (a) a communication bus coupling said plurality of server devices; and
    (b) a plurality of connection loci coupled with said communication bus, respective client devices of said plurality of client devices being coupled with selected connection loci of said plurality of connection loci;
    each respective connection locus of said plurality of connection loci being uniquely identified by a respective non-mapped address of a slot of a respective client device;
    wherein said respective client devices and replacement client devices are configured for removable coupling, and wherein replacement of said respective client devices with said replacement client devices requires no reconfiguration of said respective non-mapped address of said system.

8. The system of claim 7 wherein said plurality of server devices is a plurality of Dynamic Host Configuration Protocol servers.

9. The system of claim 8 wherein said coupling of said respective client devices with said selected connection loci is effected by the removable coupling structure.

10. The system of claim 7 wherein said coupling of said respective client devices with said selected connection loci is effected by the removable coupling structure.

* * * * *